(12) United States Patent
Fukuoka et al.

(10) Patent No.: US 7,924,393 B2
(45) Date of Patent: Apr. 12, 2011

(54) LIQUID CRYSTAL DISPLAY DEVICE

(75) Inventors: Nobuko Fukuoka, Saitama (JP);
Arihiro Takeda, Saitama (JP); Tetsuya Iizuka, Saitama (JP); Hirokazu Morimoto, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 458 days.

(21) Appl. No.: 12/111,475

(22) Filed: Apr. 29, 2008

(65) Prior Publication Data
US 2008/0309838 A1    Dec. 18, 2008

(30) Foreign Application Priority Data

Jun. 12, 2007    (JP) .................................. 2007-155039

(51) Int. Cl.
*G02F 1/1339*    (2006.01)
*G02F 1/1333*    (2006.01)
(52) U.S. Cl. .................... 349/155; 349/157; 349/110
(58) Field of Classification Search .................. 349/155, 349/157
See application file for complete search history.

(56) References Cited

U.S. PATENT DOCUMENTS

| | | | |
|---|---|---|---|
| 6,181,406 B1 | 1/2001 | Morimoto et al. | |
| 6,377,328 B1 | 4/2002 | Morimoto et al. | |
| 6,522,379 B1 | 2/2003 | Ishihara et al. | |
| 6,683,671 B1 | 1/2004 | Morimoto | |
| 6,741,318 B2 | 5/2004 | Morimoto | |
| 6,850,290 B1* | 2/2005 | Song | 349/43 |
| 6,888,609 B2 | 5/2005 | Iizuka et al. | |
| 7,133,108 B2 | 11/2006 | Shimizu et al. | |
| 7,304,712 B2 | 12/2007 | Sawasaki et al. | |
| 2004/0189928 A1* | 9/2004 | Yang et al. | 349/155 |
| 2005/0140914 A1* | 6/2005 | Sawasaki et al. | 349/155 |
| 2005/0280757 A1 | 12/2005 | Yamada et al. | |
| 2007/0002264 A1* | 1/2007 | Kim | 349/156 |

FOREIGN PATENT DOCUMENTS

| | | |
|---|---|---|
| JP | 3338025 | 8/2002 |
| JP | 2004-245952 | 9/2004 |
| JP | 3680730 | 5/2005 |
| JP | 2005-189662 | 7/2005 |

* cited by examiner

*Primary Examiner* — Wen-Ying P Chen
(74) *Attorney, Agent, or Firm* — Oblon, Spivak, McClelland, Maier & Neustadt, L.L.P.

(57) ABSTRACT

The present invention regarding a liquid crystal display device aims to further prevent generation of low-temperature bubbles in a uniform cell gap and to further improve strength against pressure applied to a glass surface while saving a production cost. A liquid crystal display device according to the present invention includes multiple spacers arranged on a liquid crystal layer side of an array substrate. The multiple spacers include: a first spacer arranged in a part of an insulating layer having no contact hole formed thereon; and a second spacer arranged inside of the contact hole. The contact hole is provided on the insulating layer and connects a switching element to either a corresponding pixel electrode or a corresponding auxiliary capacitive layer.

7 Claims, 9 Drawing Sheets

LIQUID CRYSTAL DISPLAY DEVICE

CROSS-REFERENCE TO RELATED APPLICATIONS

This application is based upon and claims the benefit of priority from Japanese Patent Application No. 2007-155039 filed on Jun. 12, 2007; the entire contents of which are incorporated herein by reference.

BACKGROUND OF THE INVENTION

1. Field of the Invention

The present invention relates to a liquid crystal display device and, in particular, to a liquid crystal display device in which spacers having a uniform height are provided on a substrate.

2. Description of the Related Art

In the recent years, research has been conducted to promote practical application of a liquid crystal display device which not only has a high density and a high capacity but also is capable of providing high performance and displaying high-definition images. There are various types of such a liquid crystal display device available. Among others, an active matrix-type liquid crystal display device has been widely used for several reasons, such as that crosstalk between adjacent pixels is small, a high-contrast image can be obtained, images can be displayed in the transmissive mode, and the display area can easily be made larger. In this active matrix-type liquid crystal display device, a thin film transistor (TFT) as a switching element and a pixel electrode are provided on an array substrate at each of intersections between multiple scanning lines and multiple signal lines which are arranged so as to intersect with each other.

Liquid crystal display devices are commonly provided with spacers for obtaining a uniform gap between an array substrate and an opposite substrate facing the array substrate. There are spherical and pillar spacers. The spherical spacer is applied in a production process for pasting the array substrate and the opposite substrate together. The pillar spacer is formed integrally either on the array substrate or the opposite substrate by the photolithographic method in a production process of the substrate. Since the pillar spacer can be arranged in the vicinity of the intersections between the scanning lines and the signal lines without overlapping with pixel electrodes, it is possible to obtain a good display quality. As for the region where the pillar spacer is arranged, in order to maintain the uniformity of the cell gap, a region is selected so that both the array substrate and the opposite substrate can secure a stable flatness, and the spacers are arranged at the same position in each of the pixels (for example, see Japanese Patent No. 3680730 and Japanese Patent Application Publication No. 2004-245952).

In order to arrange the pillar spacers, regions are selected so that both the array substrate and the opposite substrate can secure a stable flatness. Then, the pillar spacers are respectively arranged at the same positions within the selected regions in the pixels.

The density of the spacers largely affects the basic characteristics of a liquid crystal display device. Not only is a certain level of density needed for maintaining the uniformity of the cell gap, but also the density of the spacers needs to be increased to achieve high durability against pressure applied to a glass surface. In a display device having a high spacer density, on the other hand, a hollow portion is generated inside of the display device when pressure is applied to the surface of the display device at a low temperature (hereafter referred to as low-temperature bubble) because the rate of contraction of liquid crystal is faster than that of elastic deformation of the spacers. Therefore, the display quality is significantly deteriorated. In order to solve this problem, a technology has been recently disclosed for increasing durability against local external pressurization while preventing generation of low-temperature bubbles by forming two kinds of spacers having different heights on a substrate (for example, see, Japanese Patent Application Publication No. 2005-189662).

In addition to the publication described above, various proposals have been made for an arrangement of two kinds of pillar spacers having different heights on a substrate (for example, see, Japanese Patent No. 3338025).

However, it is still necessary to increase the density of spacers in order to obtain high durability against pressure applied to the glass surface. A certain level of spacer density or above is also required to obtain a uniform cell gap. On the other hand, the spacer density has to be lowered in order to improve the device in terms of the performance against low-temperature bubbles. Therefore, there is a problem that it is extremely difficult to improve the device in terms of the performance against pressure applied to the glass surface and the performance against low-temperature bubbles at the same time.

Moreover, if a configuration is employed in which spacers having different heights are formed on a substrate in order to solve the problems described above, a new problem of increasing production costs arises due to an increased number of production processes.

SUMMARY OF THE INVENTION

An object of the present invention regarding a liquid crystal display device is to prevent generation of low-temperature bubbles in a uniform cell gap and to improve the strength against pressure applied to the glass surface without increasing a production cost.

A liquid crystal display device according to the present invention includes: an array substrate; multiple signal lines, multiple scanning lines, and multiple auxiliary capacitive lines, which are provided on the array substrate; a switching element arranged at each of intersections between the signal lines and the scanning lines; a pixel electrode and an auxiliary capacitive layer which are connected to the switching element; an insulating layer formed on the array substrate; a contact hole, which is formed in the insulating layer, for connecting the switching element to either the corresponding pixel electrode or the corresponding auxiliary capacitive layer; an opposite substrate arranged to face the array substrate; an opposite electrode formed on the opposite substrate; and multiple spacers arranged on the liquid crystal layer side of the array substrate. The multiple spacers include: a first spacer that is arranged on a part of the insulating layer having no contact hole; and a second spacer which is formed inside of the contact hole.

Another liquid crystal display device according to the present invention includes: an array substrate; multiple signal lines and multiple scanning lines, which are provided on the array substrate; a switching element arranged at each of intersections between the signal lines and the scanning lines; a pixel electrode and an auxiliary capacitive layer which are connected to the switching element; an insulating layer formed on the array substrate; a contact hole, which is formed in the insulating layer, for connecting each switching element to either a corresponding pixel or a corresponding auxiliary capacitive layer; an opposite substrate arranged to face the array substrate; an opposite electrode formed on the opposite substrate; multiple spacers arranged on the liquid crystal layer side of the array substrate; a light-shielding layer which is formed in a line on the liquid crystal layer side of the opposite substrate, and which includes a wide portion having a larger width than a width of the line; and a colored layer formed on a part of the light-shielding layer. The multiple spacers include: a first spacer which is arranged on a part of the insulating layer having no contact hole so as to face the wide portion of the light-shielding layer; and a second spacer which is arranged on a part of the insulating layer having no contact hole so as not to face the wide portion of the light-shielding layer.

According to the liquid crystal display device of the present invention, it is possible to further prevent generation of low-temperature bubbles in a uniform cell gap and to further improve the strength against pressure applied to the glass surface without increasing a production cost.

DESCRIPTION OF THE EMBODIMENTS

In the following section, embodiments of the present invention will be described with reference to the drawings.

Figure 1:
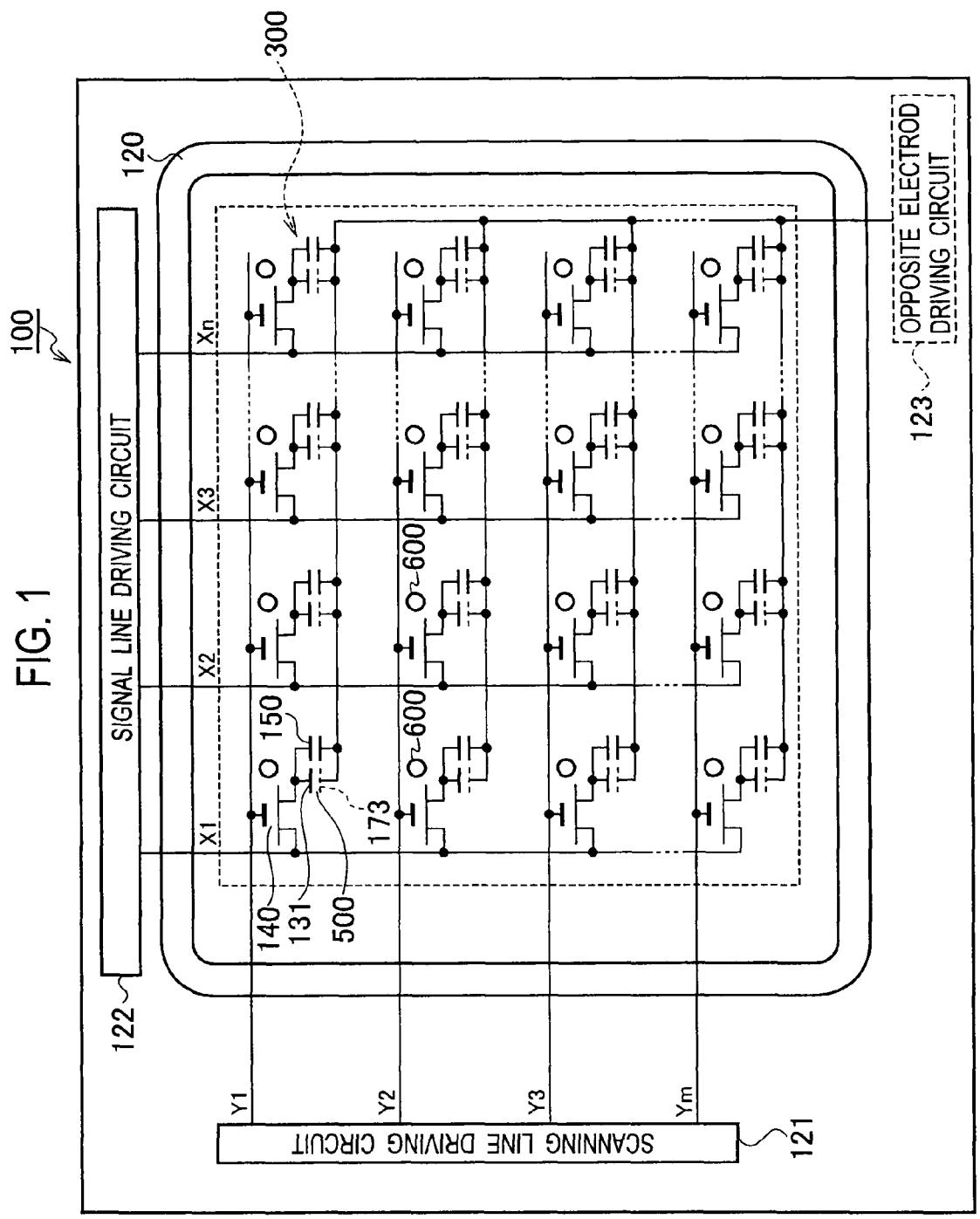
FIG. 1 is a plan view illustrating a configuration of an array substrate of a liquid crystal display device according to embodiments of the present invention.

The plan view in FIG. 1 schematically illustrates a configuration of an array substrate of a liquid crystal display device according to embodiments of the present invention. A display region 300 indicated by dotted lines is provided on an array substrate 100. In this configuration, an adhesive agent 120 is applied so as to surround the display region 300 seamlessly. Such an application of the adhesive agent 120 allows no liquid crystal to leak to the outside of the region surrounded by the inner wall of the adhesive agent 120; thus, it is possible to paste the array substrate 100 and a substrate facing the array substrate 100 together by dripping a predetermined amount of liquid crystal in a one-drop fill method.

In the display region 300, a total of m lines of scanning lines Y1 to Ym (hereafter collectively referred to as Y), and a total of n lines of signal lines X1 to Xm (hereafter collectively referred to as X) are arranged so as to intersect with each other. At each of the intersections, a thin film transistor 140 (hereafter referred to as a pixel TFT) which serves as a switching element, a transparent pixel electrode 131, and an auxiliary capacitor 150 are arranged. A TFT having a semiconductor layer made of amorphous silicon (a-Si) is used as the pixel TFT 140. To be more specific, the pixel TFT 140 includes: a source terminal that is connected to the signal line X; a drain terminal that is connected to the auxiliary capacitor 150 and the pixel electrode 131 in parallel; and a gate terminal that is connected to the scanning line Y. An opposite electrode 173 is arranged facing each of the pixel electrodes 131 across a liquid crystal layer 500. Multiple spacers 600 are arranged for each of the pixel electrodes 131.

In the region surrounding the display region 300, a scanning line driving circuit 121, a signal line driving circuit 122, and an opposite electrode driving circuit 123 are arranged. The scanning line driving circuit 121 is connected to the scanning lines Y to sequentially drive the scanning lines. The signal line driving circuit 122 is connected to the signal lines X to send image signals. The opposite electrode driving circuit 123 is connected to the auxiliary capacitors 150 and the opposite electrodes 173 to supply a predetermined potential.

In the following section, a more detailed description will be given of liquid crystal display devices according to first and second embodiments of the present invention.

First Embodiment

A description will be given of a liquid crystal display device according to a first embodiment of the present invention.

A configuration of an opposite substrate 200 will be described with reference to FIGS. 2 and 3. As shown in the plan view in FIG. 2, a light-shielding layer 210 is formed in a line in a display region 300. In the peripheral part of the display region 300, the light-shielding layer 210 is formed in a frame shape. A color filter 220 is formed between the light-shielding layers 210. As shown in the plan view in FIG. 3, colored layers (indicated by the dotted lines in the drawing) of the color filter 220 are formed on a part of the light-shielding layer 210. A red colored layer (R), a green colored layer (G), and a blue colored layer (B) are formed in this order repeatedly. In this configuration, a shape 211 having a larger width W2 in some parts than the line width W1 (hereafter referred to as a wide-width portion 211) is formed in the light-shielding layer 210. In this case, the line width W1 is set to, for example, 5 μm, and the shape of the wide-width portion 211 is set to, for example, a square of a side length W2 of 15 μm.

Figure 3:
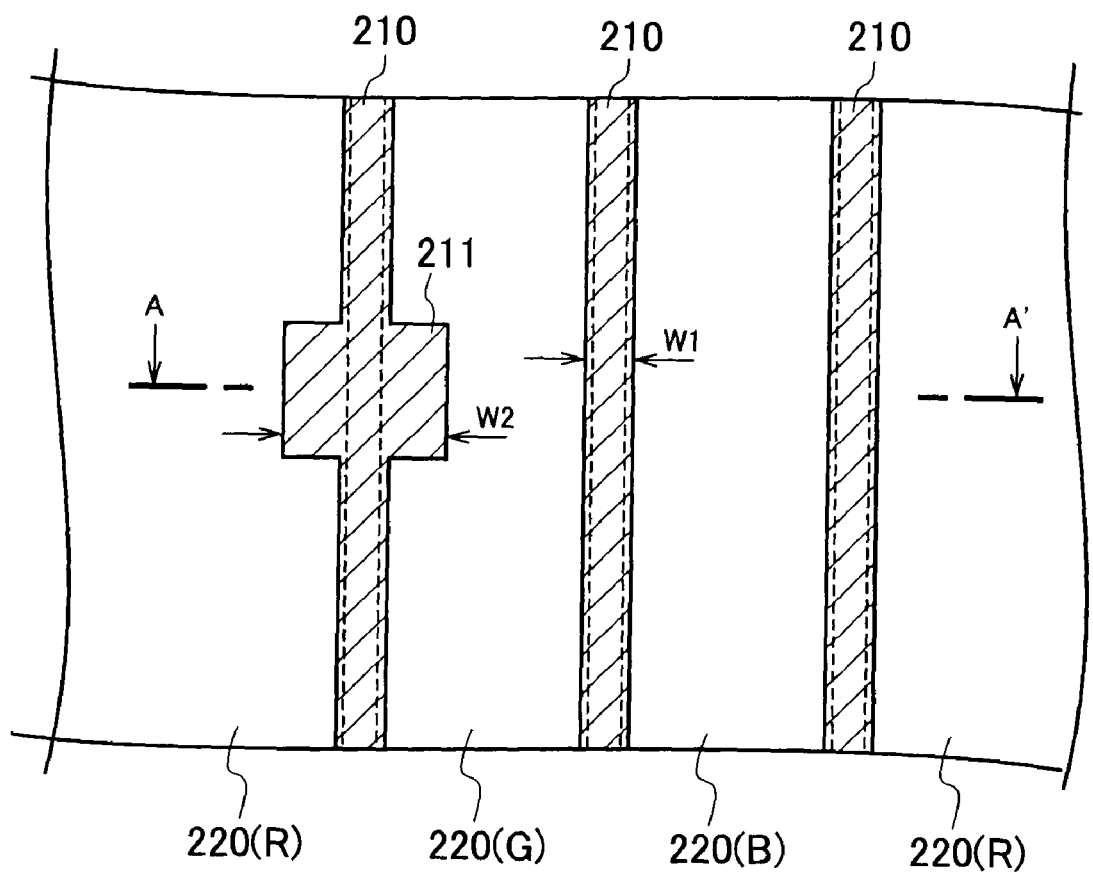
FIG. 3 is an enlarged plan view illustrating a part of the opposite substrate of the liquid crystal display device according to the first embodiment.
Figure 4:
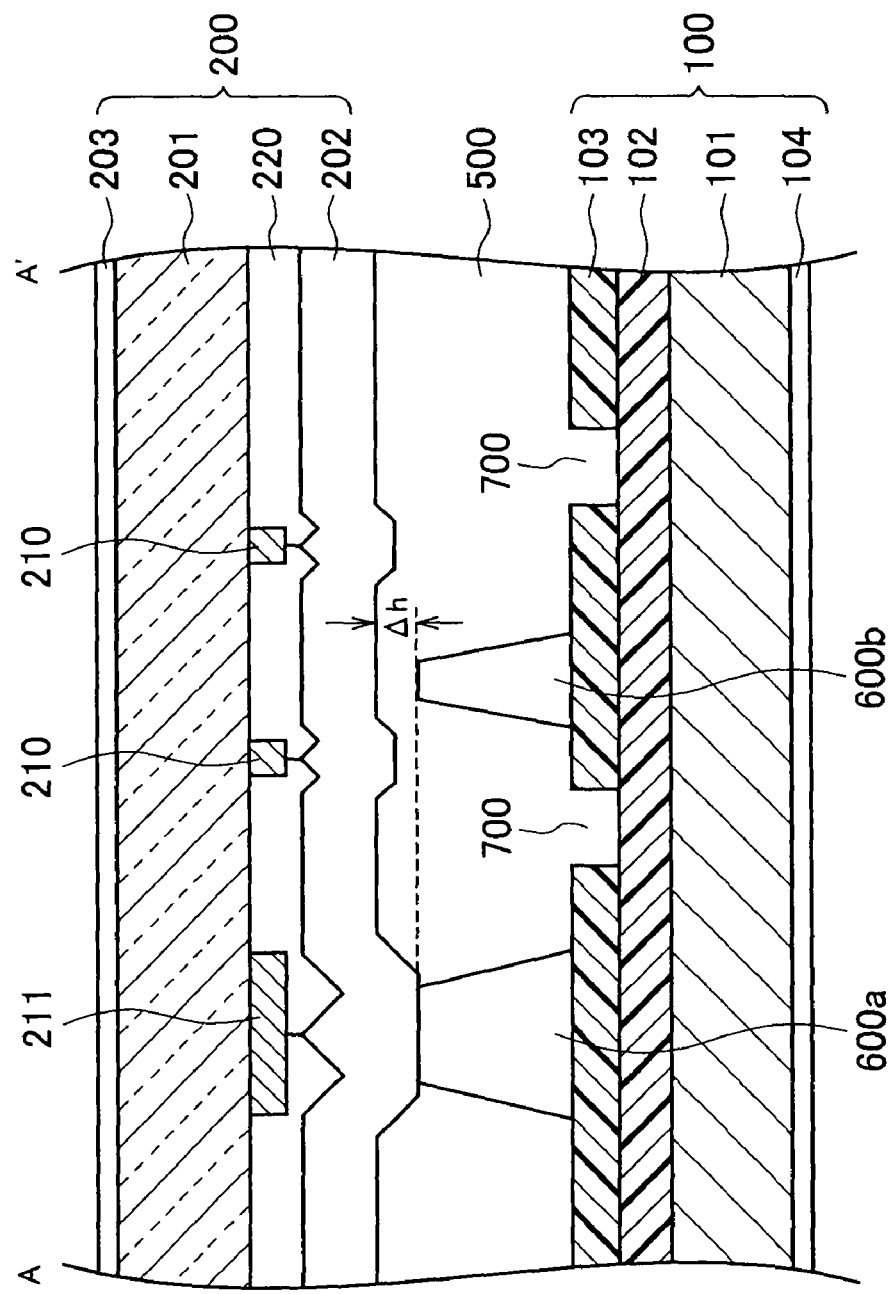
FIG. 4 is a cross-sectional view of the liquid crystal display device taken along the line indicated by A-A' in FIG. 3.

FIG. 4 illustrates the cross-sectional view of the liquid crystal display device taken along the line indicated by A-A' in FIG. 3. The liquid crystal display device includes: an array substrate 100 and the opposite substrate 200, which are arranged to face each other; and a liquid crystal layer 500, which is supported by these substrates in the gap therebetween.

In the array substrate 100, a first insulating layer 102 and a second insulating layer 103 are formed on a glass substrate 101. Although not shown in the drawing, these insulating layers are provided with, for example, an auxiliary capacitive layer and a transparent electrode made of polysilicon, which are connected to the pixel TFT. A spacer 600 having a pillar shape is formed on the first insulating layer 102 and the second insulating layer 103 on the side of the liquid crystal layer 500. In this case, pillar projections serving as the spacer 600 are formed integrally on the substrate so as to have a uniform height by, for example, a photolithographic method.

By adopting this process, it is possible to reduce the number of production processes for the production of the array substrate, compared to the case where projections having different heights are formed; thus, the production cost can be reduced. In addition, the spacer 600 is formed, in a flat region of the second insulating layer 103, away from a contact hole 700 formed thereon. A polarizer 104 is arranged, on the glass substrate 101, on the opposite side of the liquid crystal layer 500. On the backside of the array substrate 100, a backlight, which is not shown in the drawing, is arranged for irradiating the display region 300 with light for display.

In the opposite substrate 200, a polarizer 203 is arranged, on a glass substrate 201, on the opposite side of the liquid crystal layer 500. A light-shielding layer 210 is formed, on the glass substrate 201, on the side of the liquid crystal layer 500. A color filter 220 is formed between the lines of the light-shielding layers 210. In this case, in order to prevent occurrence of light leakage and color mixture due to accuracy in colored layer patterning, the colored layers are formed partly on a linear part of the light-shielding layer 210 and on the wide-width portion 211 of the light-shielding layer. An overcoating layer 202 is formed for flatness to cover the light-shielding layer 210, the wide-width portion 211, and the color filter 220. In addition, although not shown in this drawing, an opposite electrode is formed on the overcoating layer 202.

Since the amount of colored layers formed on the wide-width portion 211 of the light-shielding layer is larger than that on a linear part of the light-shielding layer 210, unevenness is generated on the opposite substrate. In this configuration, some of the multiple spacers are each arranged on the array substrate 100 as a first spacer 600a so as to face the wide-width portion 211 of the light-shielding layer. In the meantime, other spacers, which do not face the wide-width portion 211 of the light-shielding layer, are each arranged as a second spacer 600b so as to face, for example, a region of the color filter 220, where no light-shielding layer 210 overlaps with a colored layer.

The first spacer 600a is in contact with the opposite substrate 200, while the second spacer 600b is not in contact with the opposite substrate 200. Accordingly, the effective height of the first spacer 600a is higher by Δh than the effective height of the second spacer 600b. In this case, the difference in the effective height between the first spacer 600a and the second spacer 600b, Δh, is set to be, for example, 0.5 μm.

By having such a configuration, it is possible with the first spacer 600a to restrain generation of low-temperature bubbles while maintaining uniformity of the cell gap, and possible with the second spacer 600b to control the strength against pressure applied to the substrate surface.

Figure 5:
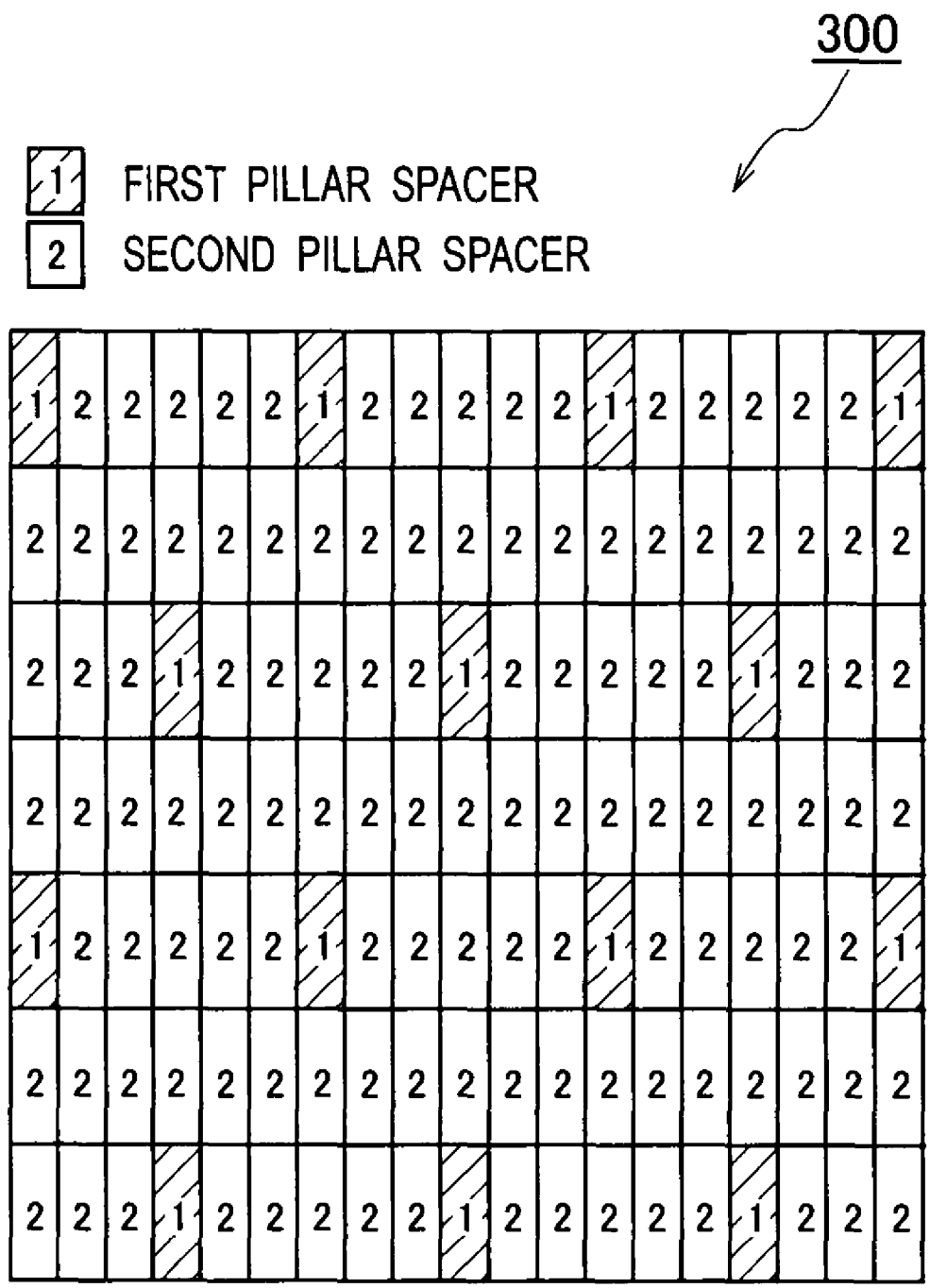
FIG. 5 is a schematic plan view illustrating a density of spacers in a display region in the liquid crystal display device according to the first embodiment.

The plan view in FIG. 5 schematically shows the density (arrangement density) of the spacers in the display region 300 in the liquid crystal display device. In this drawing which illustrates pixels constituting the display region in a matrix, shaded areas indicate pixels where the first spacer 600a is arranged, and white areas indicate pixels where the second spacer 600b is arranged. In this case, the first spacer 600a is arranged in every 12 pixels, while the second spacer 600b is arranged in 11 pixels in every 12 pixels. As a result of such an arrangement, the density of the first spacer 600a is more than 5 times smaller than the density of the second spacer 600b.

By having the density of the first spacers 600a smaller than the density of the second spacers 600b as described above, it is possible with the first spacer 600a to largely decrease occurrence of low-temperature bubbles while maintaining the minimum density required for obtaining a uniform cell gap. In the meantime, by arranging the second spacer 600b as many as possible to increase the maximum density, it is also possible to largely enhance the strength against pressure applied to the glass surface.

It should be noted that the cross-sectional area of the first spacer 600a in a direction parallel to the substrate is made approximately twice larger than the cross-sectional area of the second spacer 600b so that the spacers are efficiently arranged. By having such a configuration, it is possible to control the size variation of the first spacers 600a with a high degree of accuracy while maintaining the minimal density by reducing the number of the first spacers 600a arranged, and to maintain a high density of the second spacers 600b by increasing the number of the second spacers 600b arranged.

Therefore, according to the present embodiment, while a portion having a larger width than the line width on the light-shielding layer 210 is defined as the wide-width portion 211 on the opposite substrate, the first spacer 600a is formed on the array substrate 100 so as to face the wide-width portion 211. The amount of the colored layers of the color filter 220 formed on the wide-width portion 211 of the light-shielding layer is larger than that on a linear part of the light-shielding layer. Accordingly, there is unevenness on the opposite substrate 200, resulting in the effective height of the first spacer 600a higher by Δh. By having this configuration, it is possible with the first spacer 600a to prevent generation of low-temperature bubbles while maintaining uniformity of the cell gap, and it is possible with the second spacer 600b to control strength against pressure applied to the substrate surface. It should be noted that, since spacers having a uniform height are arranged on the array substrate, it is possible to reduce the number of production processes, compared to the case where two kinds of spacers having different heights are arranged.

According to the present embodiment, by having the density of the first spacers 600a smaller than the density of the second spacers 600b in the display region 300, it is possible with the first spacer 600a to largely decrease the occurrence of low-temperature bubbles while maintaining the minimum density for obtaining a uniform cell gap. In the meantime, by arranging the second spacer 600b as many as possible to increase the maximum density, it is also possible to largely enhance strength against pressure applied to the glass surface.

According to the present embodiment, by making the cross-sectional area of a first spacer 600a larger than the cross-sectional area of a second spacer 600b in the display region 300, it is possible to control the size variation of the first spacers 600a with a high degree of accuracy while maintaining the minimal density by reducing the number of the first spacers 600a arranged; and to maintain a high density of the second spacer 600b by increasing the number of the second spacers 600b arranged.

It should be noted that the difference in the effective height between the first spacer 600a and the second spacer 600b, Δh, is set to be 0.5 μm in the present embodiment; however, the difference in the effective height is not limited to this value. For example, it is possible to obtain the same effect as the present embodiment as long as Δh is in a range from 0.3 μm to 1.0 μm. If Δh is to be set to the above range, it is effective to adjust, for example, the area of the wide-width portion 211 of the light-shielding layer 210 and the conditions for application of the overcoating layer 202. In addition, a value of Δh may be set to be smaller than 0.5 μm (which is the value of Δh in the present embodiment) with small unevenness on the opposite substrate formed by arranging the second spacer 600b so as to face a linear part of the light-shielding layer 210.

The shape of the wide-width portion 211 formed in the light-shielding layer 210 is set to be a square in the present embodiment; however, the shape is not limited to a square. As long as having a larger width than the line width, the shape of the wide-width portion 211 may be, for example, quadrangles, such as rectangle, rhomboid, and circle.

Second Embodiment

In the following section, a description will be given of a liquid crystal display device according to a second embodiment of the present invention. It should be noted that the same portions as in the first embodiment are denoted by the same reference numerals, and the description thereof is omitted.

Figure 6:
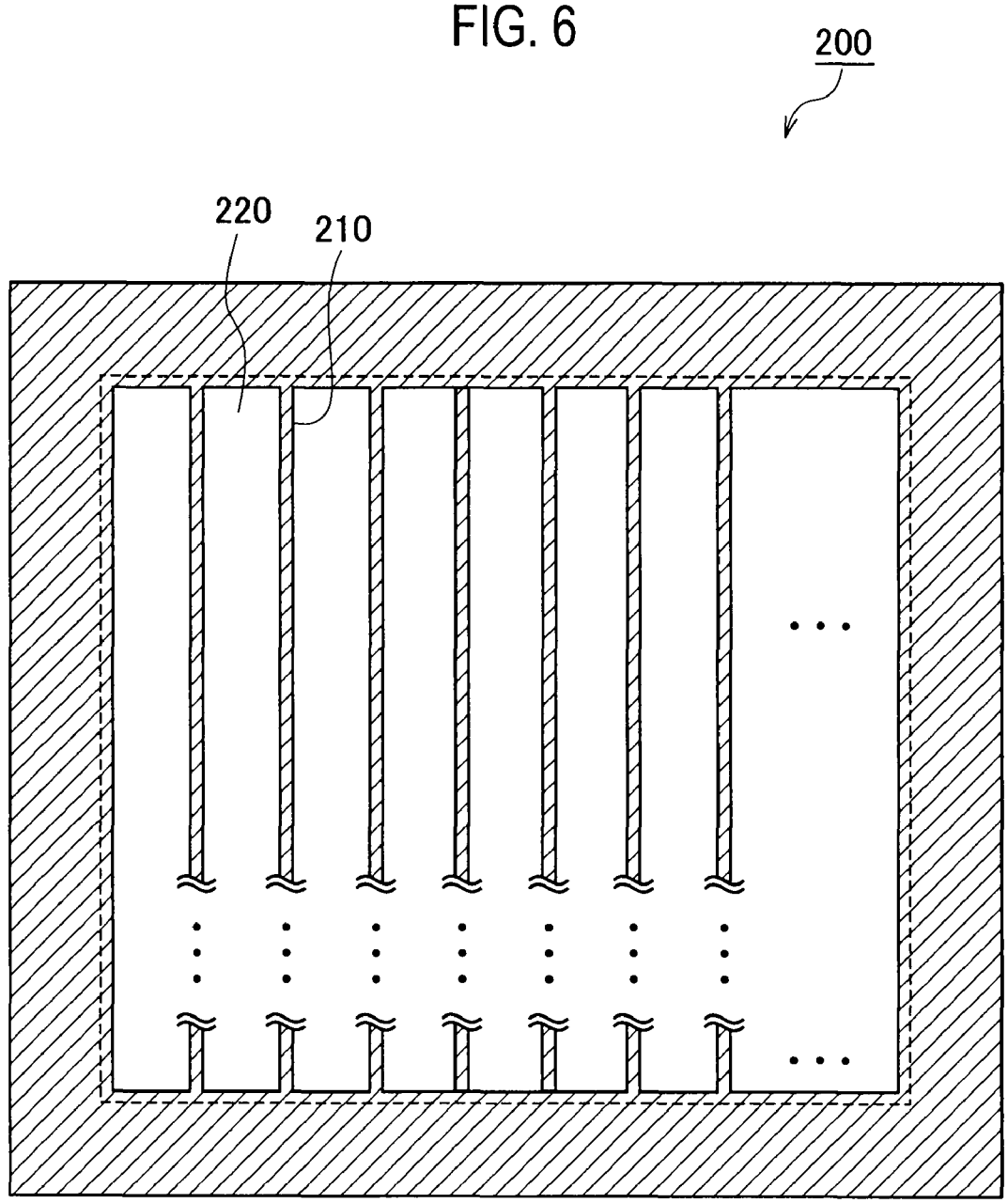
FIG. 6 is a schematic plan view illustrating a configuration of an opposite substrate of a liquid crystal display device according to a second embodiment.
Figure 7:
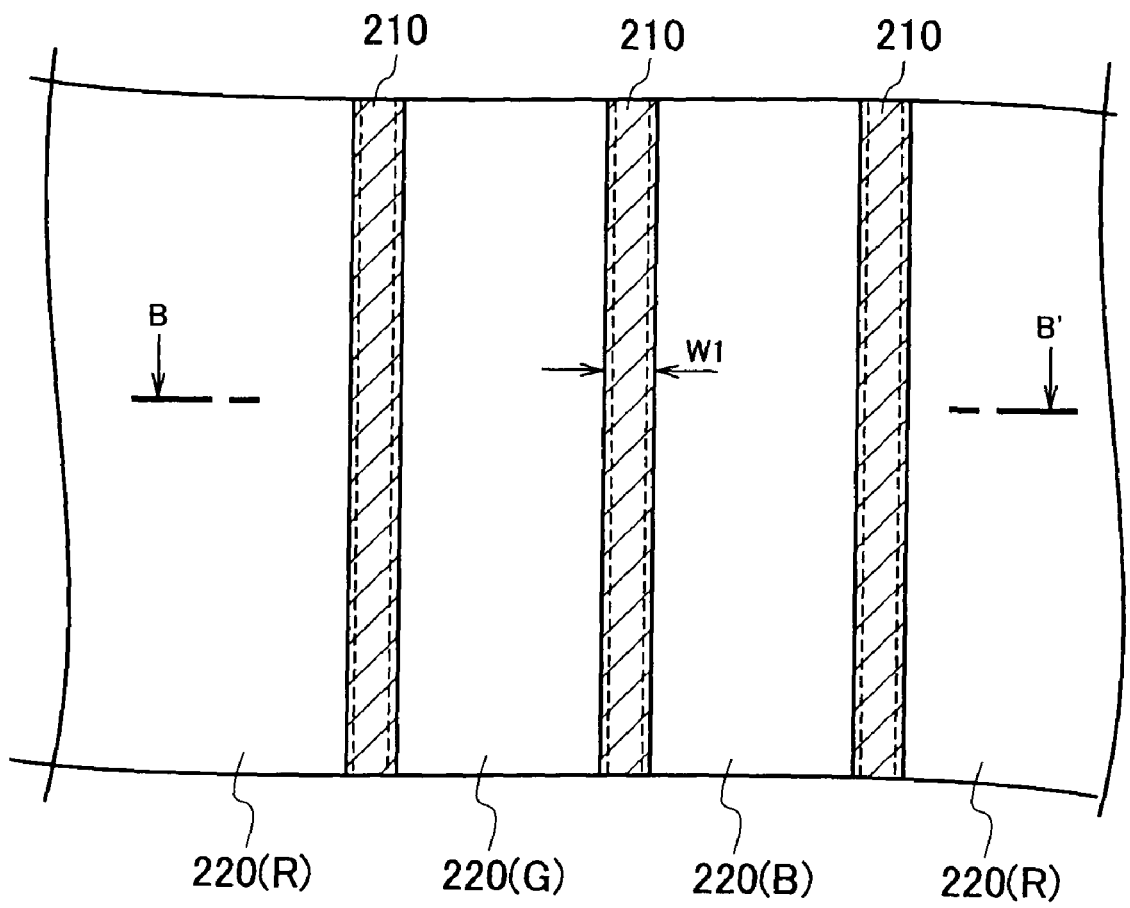
FIG. 7 is an enlarged plan view illustrating a part of the opposite substrate of the liquid crystal display device according to the second embodiment.

A configuration of an opposite substrate 200 is described with reference to FIGS. 6 and 7. As shown in the plan view in FIG. 6, a light-shielding layer 210 is formed in a liner in a display region 300. In the peripheral part of the display region 300, the light-shielding layer 210 is formed in a frame shape. The difference of the present embodiment from the first embodiment is that the light-shielding layer 210 in the present embodiment does not have a shape 211 (wide-width portion 211) having a width W2 larger than the line width W1. FIG. 7 is an enlarged view of any part of the display region 300 illustrated in FIG. 6. As shown in FIG. 7, the line width of the light-shielding layer 210 is W1 only.

Figure 8:
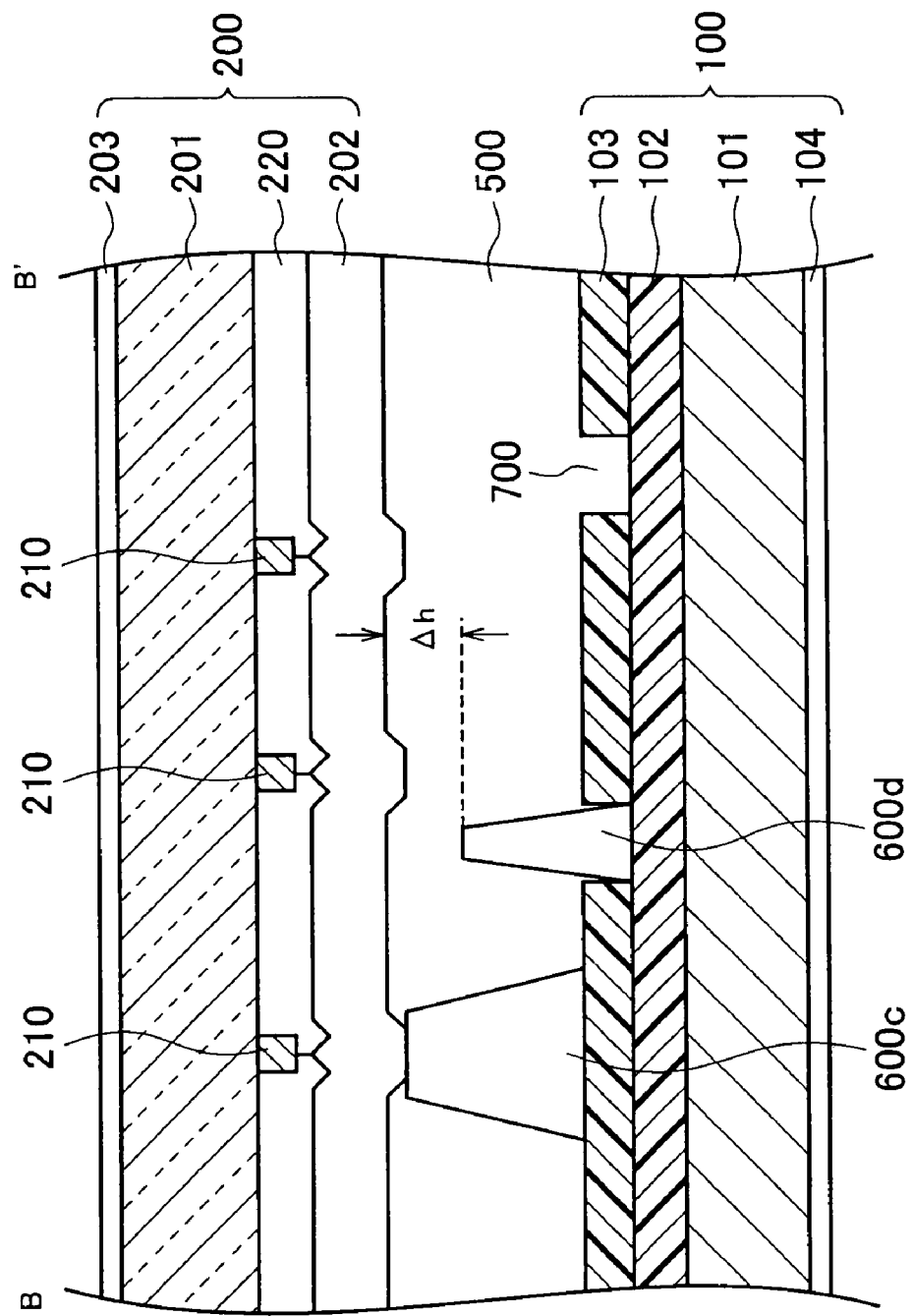
FIG. 8 is a cross-sectional view of the liquid crystal display device taken along the line indicated by B-B' in FIG. 7.

FIG. 8 illustrates the cross-sectional view of the liquid crystal display device taken along the line indicated by B-B' in FIG. 7. The liquid crystal display device includes: an array substrate 100 and the opposite substrate 200, which are arranged to face each other; and a liquid crystal layer 500, which is supported by the substrates in the gap therebetween. In the present embodiment, the thickness of the liquid crystal layer 500 is 3 μm.

In the array substrate 100, a first insulating layer 102 and a second insulating layer 103 are formed on a glass substrate 101. A pixel electrode, which is not shown in the drawing, is formed on these insulating layers. These insulating layers are also provided with contact holes 700 for connecting a drain electrode 59 of a pixel TFT 140 to the pixel electrode. The depth of the contact holes 700 is approximately 2 μm.

A first spacer 600c is formed on the first insulating layer 102 and the second insulating layer 103 on the side of the liquid crystal layer 500. To be more specific, the first spacer 600c is formed in a flat region having no contact hole 700 provided therein on the second insulating layer 103. The first spacer 600c shown in the drawing is arranged on the second insulating layer 103 so as to face the light-shielding layer 210.

A second spacer 600d is formed so as to be buried in the contact hole 700. The second spacer 600d shown in the drawing is arranged so as to face a region of the color filter 220, where no light-shielding layer 210 overlaps with a colored layer.

It should be noted that the first spacer 600c and the second spacer 600d are formed in the same process. By having such a process, it is possible to reduce the number of production processes for the production of the array substrate, compared to the case where projections having different heights are formed in different processes; and therefore to reduce a production cost.

Figure 9:
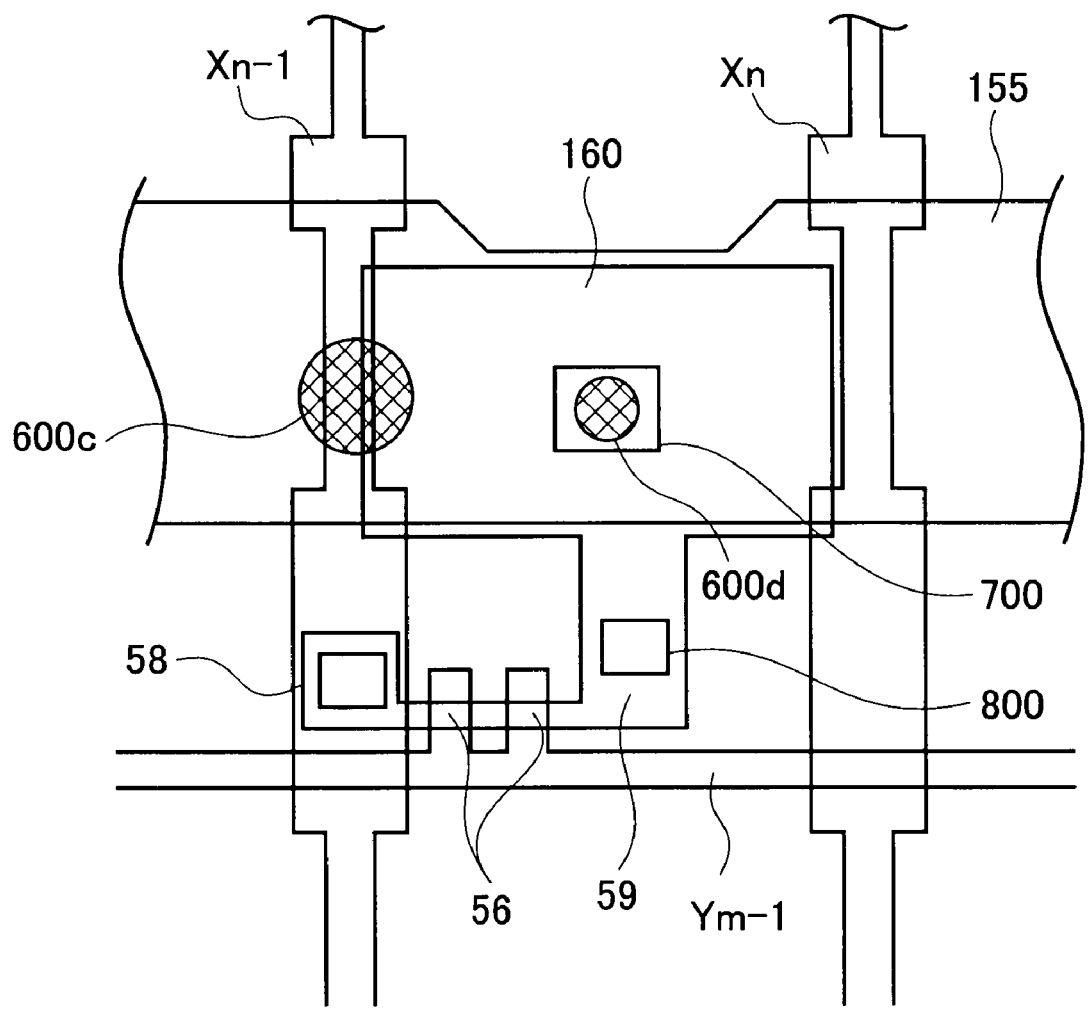
FIG. 9 is a plan view illustrating a configuration of an array substrate of the liquid crystal display device according to the second embodiment.

FIG. 9 is a plan view of the array substrate 100, and, more particularly, a plan view of the array substrate 100 which is arranged so as to face the part indicated by B-B' in the opposite substrate 200 in FIG. 7. FIG. 9 is also a schematic view of a region of the array substrate 100 including any pixel TFT 140 in the display region 300 described in the FIG. 1 and the adjacent part thereof.

The pixel TFT 140 includes a source electrode 58, a gate electrode 56, and a drain electrode 59. The drain electrode 59 is connected to the pixel electrode via the contact hole 700. The drain electrode 59 is also connected to an auxiliary capacitive layer 160 made of polysilicon via a different contact hole 800. The auxiliary capacitive layer 160 and an auxiliary capacitive line 155 constitute an auxiliary capacitor 150.

The first spacer 600c is arranged at an intersection of a signal line Xn−1 and the auxiliary capacitive line 155. Meanwhile, the second spacer 600d is arranged so as to be buried in the contact hole 700 for connecting the drain electrode 59 to the pixel electrode.

As for the cross-sectional shapes of the spacers of the present embodiment shown in FIG. 9, the cross-sectional area of the first spacer 600c is larger than the cross-sectional area of the second spacer 600d.

By making the cross-sectional area of the first spacer 600c larger than the cross-sectional area of the second spacer 600d in the display region 300, it is possible to control the size variation of the first spacers 600c with a high degree of accuracy while maintaining the minimal density thereof by reducing the number of the first spacers 600c arranged; and to maintain a high density of the second spacer 600d by increasing the number of the second spacers 600d arranged.

It should be noted that cross-sectional areas of the first spacer 600c and the second spacer 600d may be the same.

As described above, with the first spacer 600c formed on the insulating layer and the second spacer 600d formed inside of the contact hole 700, the difference in the effective height between the first spacer 600c and the second spacer 600d, Δh, is 0.5 μm due to the depth of the contact hole 700, in the present embodiment. In other words, in the present embodiment, when spacer materials are evenly applied to coat the substrate in a spacer formation process, the coating material forms a concave portion at a recessed portion formed by the contact hole. Then, by exposing the substrate coated with the coating material to form a pillar spacer, the first pillar spacer 600c and the second pillar spacer 600d having different heights are formed by themselves.

Accordingly, in the present embodiment employing such a configuration, as well as the first embodiment, it is possible with the first spacer 600c to prevent generation of low-temperature bubbles while maintaining uniformity of the cell gap. With the second spacer 600d, it is possible to control strength against pressure applied to the substrate surface.

It is also possible with the first spacer 600c to largely decrease the occurrence of low-temperature bubbles while maintaining the minimum density required for obtaining a uniform cell gap. In the meantime, by arranging the second spacer 600d as many as possible to increase the maximum density, it is also possible to largely enhance the strength against pressure applied to the glass surface.

In the present embodiment, spacers are simply arranged inside of the contact holes in addition to on the insulating layer, which is where spacers are arranged in a conventional method; thus, it is easy to create the difference in the effective height between the spacers, Δh, in a conventional production process. Since the densities of the first spacers and the second spacers can easily be changed, the design freedom is increased.

It should be noted that, the second spacer 600d is formed to be buried in the contact hole 700, which is for connecting the pixel TFT to the pixel electrode in the present embodiment; however, the contact hole where the second spacer 600d is formed is not limited to the contact hole 700. The contact hole where the second spacer 600d is formed to be buried therein may be, for example, a contact hole 800 which is for connecting the pixel TFT to the auxiliary capacitive layer 160.

Figure 2:
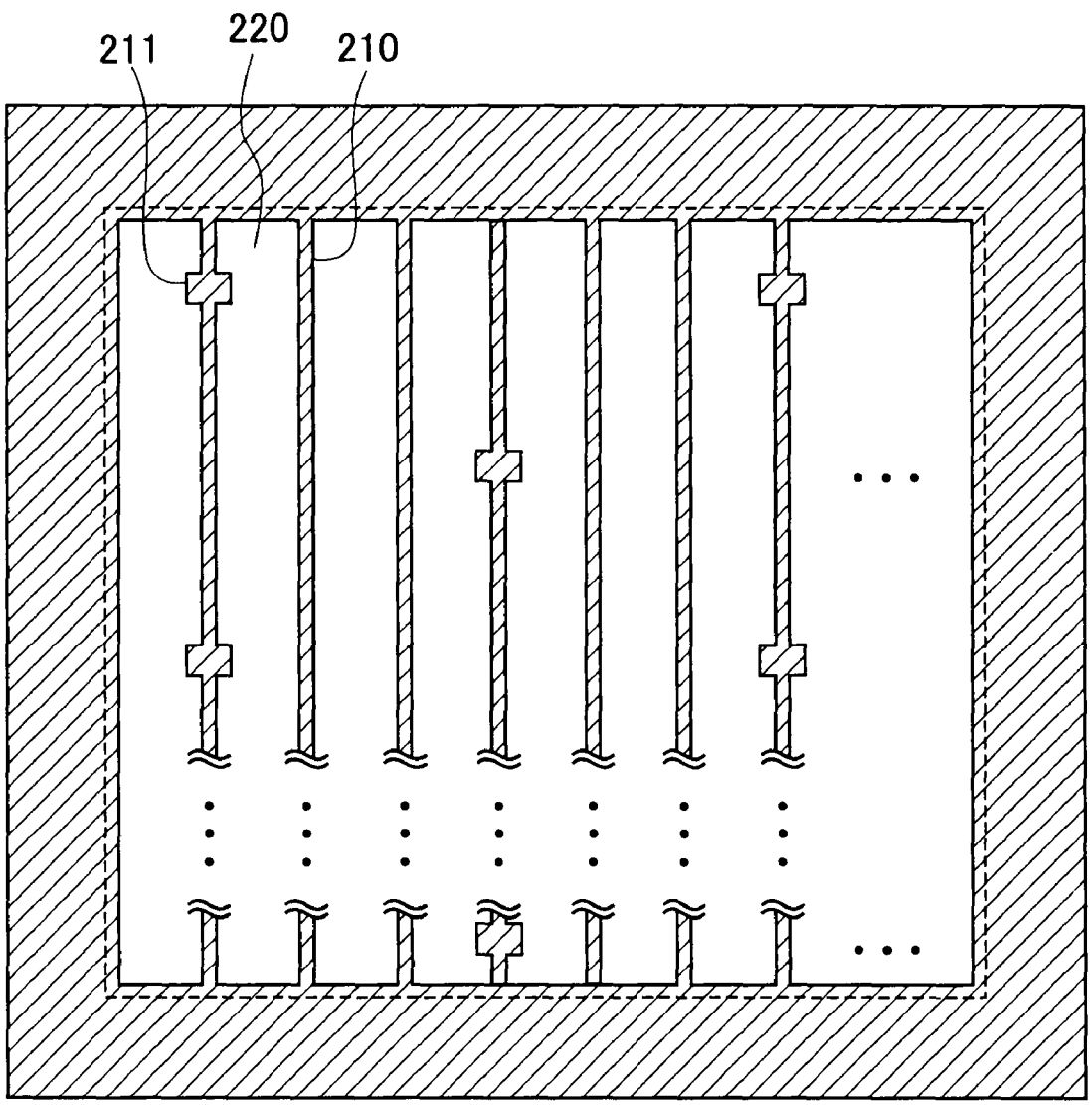
FIG. 2 is a schematic plan view illustrating a configuration of an opposite substrate of a liquid crystal display device according to a first embodiment.

When the shape of the light-shielding layer located on the side of the opposite substrate in the present embodiment is made to be the shapes illustrated in FIGS. 2 and 3 of the first embodiment, it is possible to further adjust the difference in the effective height, Δh.

Colored layers of the color filter 220 are formed on a part of the light-shielding layer 210. A red colored layer (R), a green colored layer (G), and a blue colored layer (B) are formed in this order repeatedly. In this configuration, the light-shielding layer 210 includes a shape 211 (hereafter referred to as a wide-width portion 211) having a larger width W2 than the line width W1 in some parts. In this case, the line width W1 is set to, for example, 5 µm, and the shape of the wide-width portion 211 is set to, for example, a square of a side length W2 of 15 µm.

Accordingly, the amount of colored layers formed on the wide-width portion 211 of the light-shielding layer is larger than that on a linear part of the light-shielding layer 210; thus, unevenness is generated on the opposite substrate (refer to FIG. 4). The height of this unevenness is 0.5 µm. Thereafter, the first spacer 600c is arranged on the insulating layer so as to face the wide-width portion 211 of the light-shielding layer.

As described above, by employing the shape of the light-shielding layer located on the side of the opposite substrate, as shown in FIG. 2, in the present embodiment, the difference in the effective height, Δh, of 1.0 µm can be achieved by adding the above-described height of the unevenness of 0.5 µm to the original difference in the effective height between the first spacer 600c and the second spacer 600d, Δh, of 0.5 µm.

By having the configuration described above, the difference in the effective height, Δh, can be set to be in a range from 0.3 µm to 1.0 µm. In this configuration, it is possible to increase the strength against pressure applied to the substrate surface while restraining generation of low-temperature bubbles, and possible to produce a device having such performance characteristics without an increase in the production cost.

It should be noted that it is desirable that either the first spacer 600c or the second spacer 600d be arranged in each pixel electrode. As for the density of the spacers in the display region 300 in the liquid crystal display device, as shown in FIG. 5, for example, it is desirable that the density of the first spacers 600c be smaller than the density of the second spacers 600d.

The array substrate and the opposite substrate of the liquid crystal display device are pasted together with an adhesive agent applied therebetween so as to surround the display region seamlessly. Such an application of the adhesive agent allows no liquid crystal to leak to the outside of the region surrounded by the inner wall of the adhesive agent; thus, it is possible to paste these substrates together by applying a uniform pressure on the substrate surface while dripping a predetermined amount of liquid crystal in a one-drop fill method.

What is claimed is:

1. A liquid crystal display device, comprising:
    an array substrate;
    a plurality of signal lines, a plurality of scanning lines and a plurality of auxiliary capacitive lines provided on the array substrate;
    a switching element arranged at each of intersections between the signal lines and the scanning lines;
    a pixel electrode and an auxiliary capacitive layer connected to the switching element;
    an insulating layer formed on the array substrate;
    a contact hole, formed in the insulating layer, for connecting each of the switching elements to any one of a corresponding pixel electrode and a corresponding auxiliary capacitive layer;
    an opposite substrate arranged to face the array substrate;
    an opposite electrode formed on the opposite substrate; and
    a plurality of spacers arranged on a liquid crystal layer side of the array substrate, wherein
    the plurality of spacers include: a first spacer arranged on a part of the insulating layer having no contact hole; and a second spacer formed inside of the contact hole,
    wherein an arrangement density of the first spacers is smaller than an arrangement density of the second spacers.

2. The liquid crystal display device according to claim 1, wherein the second spacer is formed inside of the contact hole that connects the switching element to the pixel electrode.

3. The liquid crystal display device according to claim 1, further comprising:
    a light-shielding layer which is formed in a line on the liquid crystal layer side on the opposite substrate, and which includes a wide portion having a larger width than the line; and
    a colored layer formed on a part of the light-shielding layer, wherein the first spacer is arranged so as to face the wide portion of the light-shielding layer.

4. The liquid crystal display device according to claim 1, wherein a cross-sectional area of the first spacer is larger than a cross-sectional area of the second spacer.

5. The liquid crystal display device according to claim 1, wherein any one of the first spacer and the second spacer is arranged in each of the pixel electrodes.

6. The liquid crystal display device according to claim 1, wherein the array substrate and the opposite substrate are pasted together by an adhesive agent applied between the substrates so as to surround a display region seamlessly.

7. A liquid crystal display device, comprising:
    an array substrate;
    a plurality of signal lines and a plurality of scanning lines provided on the array substrate;
    a switching element arranged at each of intersections between the signal lines and the scanning lines;
    a pixel electrode and an auxiliary capacitive layer connected to the switching element;
    an insulating layer formed on the array substrate;
    a contact hole, formed in the insulating layer, for connecting each switching element to any one of a corresponding pixel electrode and a corresponding auxiliary capacitive layer;
    an opposite substrate arranged to face the array substrate;
    an opposite electrode formed on the opposite substrate;
    a plurality of first and second spacers arranged on the liquid crystal layer side of the array substrate, wherein an arrangement density of the first spacers is smaller than an arrangement density of the second spacers;
    a light-shielding layer which is formed in a line on the liquid crystal layer side of the opposite substrate, and which includes a wide portion having a larger width than a width of the line; and
    a colored layer formed on a part of the light-shielding layer, wherein the plurality of spacers include:
        a first spacer arranged on a part of the insulating layer having no contact hole so as to face the wide portion of the light-shielding layer; and
        a second spacer arranged on a part of the insulating layer having no contact hole so as not to face the wide portion of the light-shielding layer.

* * * * *